United States Patent [19]
Dietz et al.

[11] Patent Number: 5,747,175
[45] Date of Patent: May 5, 1998

[54] LCP BLENDS

[76] Inventors: Erwin Dietz; Axel Schönfeld, both of Hoechst Aktiengesellschaft, D-65926 Frankfurt am Main, Germany

[21] Appl. No.: 825,601

[22] Filed: Apr. 1, 1997

[30] Foreign Application Priority Data

Apr. 1, 1996 [DE] Germany ............... 196 12 973.7

[51] Int. Cl.$^6$ ............... B32B 27/06; C08F 20/00; C09K 19/36

[52] U.S. Cl. ............... 428/480; 528/30; 528/176; 528/184; 528/185; 528/188; 528/190; 528/193; 528/194; 528/206; 528/208; 528/211; 528/212; 528/219; 525/437; 525/444; 428/357; 428/480; 252/299.01; 252/299.7

[58] Field of Search ............... 528/30, 176, 184, 528/185, 188, 190, 193, 194, 206, 208, 211, 212, 219; 525/437, 444; 428/357, 480; 252/299.01, 299.1

[56] References Cited

U.S. PATENT DOCUMENTS

| | | | |
|---|---|---|---|
| 4,410,570 | 10/1983 | Kreuzer et al. | 427/374.1 |
| 4,412,059 | 10/1983 | Krigbaum et al. | 528/192 |
| 4,652,626 | 3/1987 | Orii et al. | 528/194 |
| 5,093,025 | 3/1992 | Koide et al. | 252/299.01 |
| 5,358,661 | 10/1994 | Mazaki et al. | 252/299.01 |
| 5,362,315 | 11/1994 | Müller-Rees et al. | 106/493 |

FOREIGN PATENT DOCUMENTS

| | | |
|---|---|---|
| 2143573 | 11/1995 | Canada . |
| 0 154 953 | 9/1985 | European Pat. Off. . |
| 0 196 785 | 10/1986 | European Pat. Off. . |
| 0 283 273 | 1/1988 | European Pat. Off. . |
| 0 391 368 | 10/1990 | European Pat. Off. . |
| 0 608 991 | 8/1994 | European Pat. Off. . |
| 0 628 847 | 12/1994 | European Pat. Off. . |
| 42 40 743 | 6/1994 | Germany . |
| 43 14 736 | 11/1994 | Germany . |
| 44 16 191 | 11/1995 | Germany . |
| 44 16 993 | 11/1995 | Germany . |
| 44 18 075 | 11/1995 | Germany . |
| 2 282 145 | 3/1995 | United Kingdom . |

Primary Examiner—Samuel A. Acquah
Attorney, Agent, or Firm—Connolly & Hutz

[57] ABSTRACT

Liquid-crystalline polymer blends comprising two or more cholesteric liquid-crystalline polymers or at least one nematic liquid-crystalline polymer and at least one cholesteric liquid-crystalline polymer.

All hues can be produced specifically and in a reproducible manner by variation in the blend components and in the mixing ratio. The polymer blends are suitable as materials or as effect pigments.

19 Claims, No Drawings

LCP BLENDS

The invention relates to liquid-crystalline mixtures (blends) of cholesteric polymers with nematic and/or cholesteric polymers, to a process for their preparation, and to their use as polymeric materials and effect pigments.

Cholesteric main-chain polymers can be prepared analogously to nematic main-chain polymers using an additional chiral comonomer (U.S. Pat. No. 4,412,059; U.S. Pat. No. 4,652,626; U.S. Pat. No. 5,358,661; U.S. Pat. No. 5,093,025) or by reacting nematic main-chain polymers (LCPs) with additional chiral comonomers (EP 0 283 273 A2).

Cholesteric main-chain polymers are distinguished by a helical superstructure. This results firstly in the material no longer having the anistropy of the mechanical properties which is usual in nematic liquid-crystal polymers. In addition, the material exhibits pronounced color effects owing to selective reflection at the helical superstructure. The precise reflection color depends on the viewing angle and in particular on the pitch of the helix. For any desired viewing angle—for example a perpendicular plan view of a specimen—the reflection color is a color having a wavelength which corresponds to the pitch of the helical superstructure. This means that reflected light has a shorter wavelength the shorter the pitch of the helix. The helix pitch which forms depends essentially on the proportion of the chiral comonomer, the nature of the incorporation into the polymer, the degree of polymerization and the structure of the chiral comonomer ("helical twisting power"). In addition, many systems also exhibit a certain temperature dependence of the pitch in the cholesteric phase and thus also a variation of the coloristic properties. It is thus possible to prepare a polymer having a blue or green color effect simply by varying the proportion of the chiral comonomer.

However, it is disadvantageous in these colored polymers that the color cannot be reproduced identically directly in the synthesis. Although repetition of the synthesis of a blue polymer generally again gives a blue polymer, the polymers visibly differ in hue, so that they cannot be regarded as identical colors in conventional color test methods, which prevents their use as pigments.

In DE-A-44 16 993, it is attempted to solve the problem of precise color modification by utilizing the temperature dependence of a cholesteric main-chain polymer. However, the polymers described which have this temperature dependence have a variety of disadvantages. For example, precise color adjustment, which generally does not take place until on the painted surface of the article, for example the automobile, through precise temperature control appears very difficult and not possible at all under automobile series painting conditions, since even small temperature gradients result in hue changes.

The polymer described in DE-A-44 16 993 is based on 4-hydroxyphenyl 1-(3-hydroxy-2-methyl)propyl sulfide as the chiral component, which must be prepared in a complex synthesis. The liquid-crystal polymers are soluble in solvents, so that swelling problems again occur with a clear coat, which likewise results in a modification to the pitch and thus a change in the coloristic properties. Neither are these pigments as usually understood by the person skilled in the art, since they are soluble in many solvents. The use of polymers containing thioether groups is associated with the further disadvantage that such thioethers are very easily oxidized, and the structure of the liquid crystals is thus destroyed. Such an oxidation can take place, for example, even with small amounts of ozone, as occur in the ambient air in the summer months (DE-A1-43 14 736). The additional crosslinking step by UV irradiation is also disadvantageous. Complete crosslinking under control conditions is necessary in this system, since it otherwise crosslinks in an uncontrolled manner over the course of time owing to the UV content in sunlight. A further disadvantage in this system is that the "color-determining substance in the paint body and the essential substance in the paint body itself are identical" (DE 44 16 993 A1, page 8, lines 1–2). This means that pigments and binders cannot be freely combined, as usual in the prior art for optimizing surface properties.

U.S. Pat. No. 5,362,315 and U.S. Pat. No. 4,410,570 describe applications of crosslinked, cholesteric liquid crystals as pigments. However, these systems also have disadvantages. Firstly, they do not exhibit the requisite temperature stability under conventional series painting conditions, and secondly they swell in the paint, resulting in a color change. During baking of the paint, shrinkage of the helix and an associated further color change again take place, so that precise color adjustment is very difficult. In addition, the above-described systems in which the color has been adjusted by heat treatment or a specific temperature program do not have the desired refinish properties.

The object of the present invention is to avoid the disadvantages of the prior art and to provide a material which has reproducible coloristic properties, the temperature stability which is necessary for automobile series finishes and has high chemicals resistance (insolubility).

It has been found that the disadvantages of the prior art can be avoided, surprisingly, by using blends of cholesteric polymers with nematic and/or cholesteric polymers, and that materials can be provided which can be prepared reproducibly in their coloristic properties.

The present invention therefore relates to liquid-crystalline polymer blends comprising at least two cholesteric liquid-crystalline polymers or at least one nematic liquid-crystalline polymer and at least one cholesteric liquid-crystalline polymer.

If, for example, a cholesteric main-chain polymer (CLCP) having a dark-violet color is mixed in the melt with a nematic main-chain polymer (LCP) having the pale beige color which is typical of LCPs (this pale beige color of the LCPs will be referred to hereinafter as "colorless"), it is observed that the blend has very bright coloristic properties. Depending on the mixing ratio, very bright blue, green or even golden yellow colors are obtained. This is very surprising, since it is known to the person skilled in the art that mixing of pigments is generally associated with a drop in brightness and hue dulling.

The color shift in the blend of CLCP and LCP is presumably attributable to the fact that the LCP is blended with the CLCP in such a way that the helix pitch is specifically increased. Such an increase in the size of the helix pitch is associated with a change in the wavelength of the selectively reflected light, which is evident from a color change. Surprisingly, precise setting of the CLCP:LCP mixing ratio permits any desired reflection color to be established specifically and reproducibly. However, the hue resulting from a certain mixing ratio is not predictable and must be determined by an appropriate experiment. However, the novel blends are not restricted just to pale beige LCPs and dark violet CLCPs. The following possibilities exist for the preparation of novel LCP blends having pronounced selective reflection:

a) Blends of colorless LCPs with CLCPs whose helix pitch is highly twisted at the short-wave end (about 400 nm) of the visible spectrum or even beyond the visible spectrum:

Such CLCPs generally have a dark brownish to dark violet color which appears very dirty and not very bright. The LCP affects the helix of the CLCP in the blend therewith in such a way that it is shifted from the short-wave end of the visible spectrum into the visible spectrum, which is evident from bright reflection colors. With increasing proportion of LCP, the reflection color of the blend shifts toward colors of longer wavelength, i.e. a blend with a CLCP which itself has violet coloristic properties exhibits blue, green and finally golden yellow coloristic properties with increasing proportion of LCP.

b) Blends of colorless CLCPs with CLCPs as described under a):

The term colorless CLCPs is taken to mea CLCPs which form a cholesteric phase, but have only very weak twist, i.e. the helix pitch is greater than the long-wave limit of visible light. Such a polymer exhibits the same beige color impression as an LCP. The blends mentioned likewise exhibit bright reflection colors, attributable to the specific increase in the helix pitch of the highly twisted CLCPs through incorporation of the weakly twisted CLCPs.

c) Blends of colorless CLCPs or LCPs with colored CLCPs:

The coloristic properties of colored CLCPs, i.e. polymers which already exhibit cholesteric reflection colors, can be modified in a targeted manner by incorporation of colorless CLCPs or LCPs. The untwisted LCP or the weakly twisted CLCP can increase the helix pitch in the blend with the colored CLCP and thus result in a change in the coloristic properties. However, the color change is limited to relatively long-wave colors, since the helix pitch is increased. This means that it is possible, for example, to shift a CLCP having green coloristic properties to golden yellow coloristic properties by incorporation of LCP or colorless CLCP. However, it is not possible to shift a CLCP having green coloristic properties to blue coloristic properties by incorporation of LCP or colorless CLCP, since this would correspond to a greater twist of helix.

d) Blends of a plurality of colored CLCPs:

Blending of a plurality of colored CLCPs also permits a helix pitch and the corresponding coloristic properties to be established in a targeted manner. For example, the helix of a blue CLCP can be increased in pitch by blending with a golden yellow CLCP in such a way that a blend having green coloristic properties is obtained.

e) Blends of a plurality of colored CLCPs having different directions of rotation of the helix:

The helix pitch of a sample having a highly twisted helix can also be increased by incorporation of a sample likewise having a highly twisted helix, but the opposite direction of rotation, which is evident from relatively long-wave colors. Samples having helices of different directions of rotation are obtained simply by using the corresponding enantiomers. For example, it is possible to prepare a sample with (R)-(−)-2-methylpiperazine as chiral monomer and a corresponding sample of opposite pitch with (S)-(+)-2-methylpiperazine as chiral comonomer.

The above-described blends are not restricted to two blend components in each case. It is also possible to prepare blends of a plurality, e. g. 2 to 10, expediently 2 to 5, of components, not all of which need come under categories a.) to e.). For example, it is possible to prepare a blend of two different LCPs, one colorless CLCP, a plurality of colored CLCPs and a very highly twisted CLCP. In general, the pitch of a blend is given by the mean of the pitches of the individual components. It is expedient to select the individual blend components so that the resultant coloristic properties are within the desired range. Fine adjustment of the hue is then carried out via the mixing ratio of the components.

However, the novel LCP blends also make it possible to cover the entire color spectrum using only two different blend components. It is then unnecessary to search for another blend component for each hue; instead, one highly twisted polymer is sufficient, which can then be blended with a polymer having only weak twist, or none at all, to give any desired coloristic properties.

The blends also enable differences in the coloristic properties of various polymer batches to be compensated. For example, coloristic differences arising in the preparation of a green product from the preparation conditions not having been optimally reproduced can be compensated by appropriate blending.

For the purpose of the present invention, preference is given to polymer blends comprising one or more cholesteric liquid-crystalline polymers having selective reflection in the visible wavelength region of light and one or more cholesteric liquid-crystalline polymers having selective reflection in the invisible wavelength region of light.

For the purposes of the present invention, preference is furthermore given to polymer blends comprising at least two different cholesteric liquid-crystalline polymers, each of which has selective reflection in the visible wavelength region of light.

For the purposes of the present invention, preference is furthermore given to polymer blends comprising at least two different cholesteric liquid-crystalline polymers, each of which has selective reflection in the invisible wavelength region of light, but on different sides of the visible spectrum.

The LCP:CLCP or CLCP:CLCP mixing ratios in the novel liquid-crystalline polymer blends can be as desired and are determined by the hue aimed at in each case. The ratios extend, for example, from 1 to 99:99 to 1% by weight, preferably from 10 to 90:90 to 10% by weight of the respective components.

The nematic main-group polymers (LCPs) can be all LCPs known to the person skilled in the art, as listed in G. W. Becker, D. Braun, "Kunststoff-Handbuch", Volume 3/3, pages 219–258, Carl Hanser Verlag, Munich 1994. Preferred LCPs are those which contain monomers from the group consisting of aromatic hydroxycarboxylic acids and/or aromatic dicarboxylic acids and aromatic diols.

In these groups, aromatic hydroxycarboxylic acids can be replaced by cycloaliphatic hydroxycarboxylic acids or aromatic aminocarboxylic acids, aromatic dicarboxylic acids can be replaced by cycloaliphatic dicarboxylic acids, and aromatic diols can be replaced by aromatic diamines, aminophenols and/or cycloaliphatic diols.

Regarding the stoichiometric ratios of said monomers to one another, it must be ensured that the stoichiometry of the functional groups for polycondensation with formation of ester and/or amide bonds which is known to the person skilled in the art is ensured. In addition, the polymers may also contain components having more than two functional groups, for example dihydroxybenzoic acids, trihydroxybenzenes or trimellitic acid. These components act as branching points in the polymer and may only be added in low concentrations, for example of from 0 to 5 mol %, in order to prevent crosslinking of the material.

Particularly preferred LCPs are nematic main-group polymers built up from the following units of the individual monomer groups:

Aromatic hydroxycarboxylic acids and aminocarboxylic acids:
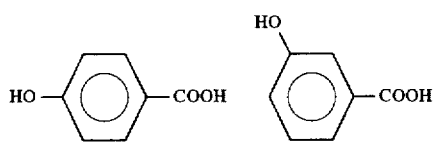
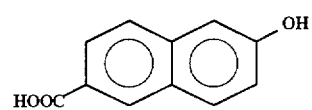
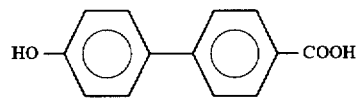
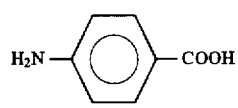
Aromatic dicarboxylic acids and aliphatic dicarboxylic acids:
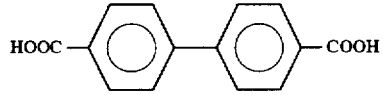
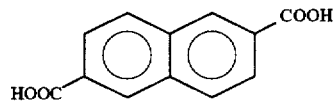
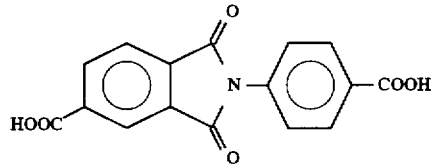
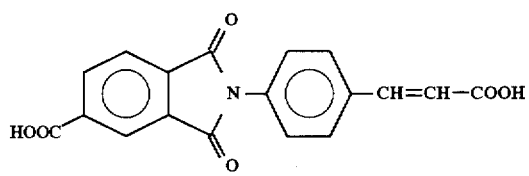
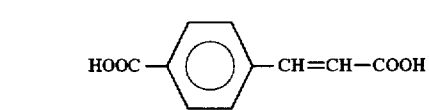
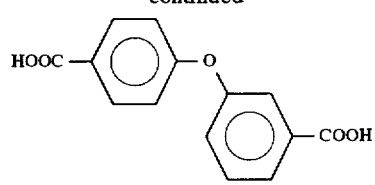
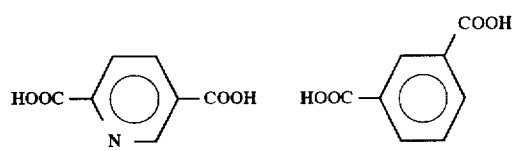
Aromatic diols, aminophenols and aromatic diamines:
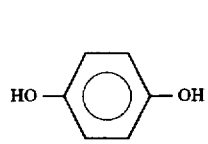 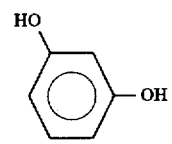
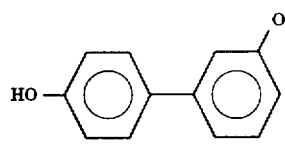
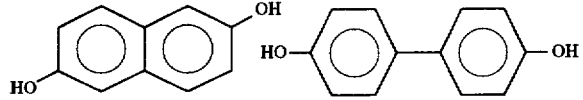
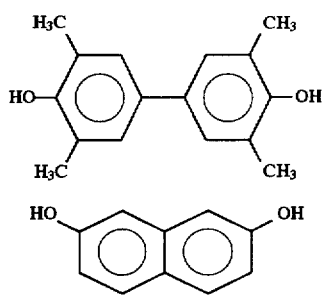
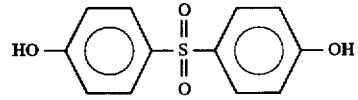
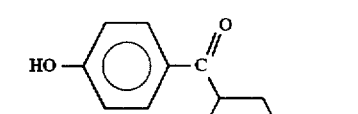
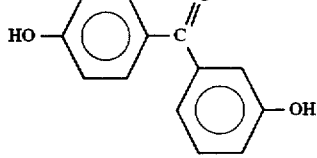
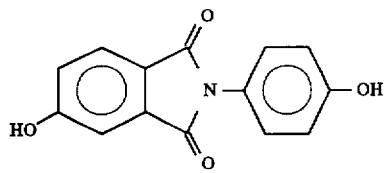

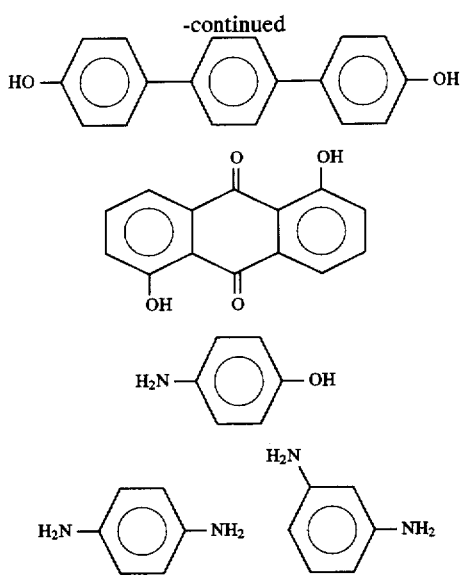

The LCPs used are very particularly preferably compounds in which the aromatic hydroxycarboxylic acid is p-hydroxybenzoic acid and/or 2-hydroxy-6-naphthoic acid, the aromatic dicarboxylic acid is 2,6-naphthalenedicarboxylic acid, terephthalic acid and/or isophthalic acid, and the aromatic diol is hydroquinone, resorcinol and/or 4,4'-dihydroxybiphenyl.

CLCPs which can be used in accordance with the invention are all cholesteric polymers. These include both cholesteric main-chain polymers and cholesteric side-group polymers.

Examples of cholesteric side-group polymers are polysiloxanes, cyclic siloxanes, polyacrylates and polymethacrylates containing mesogens in a side group. The mesogens in the side group can contain all structures known to the person skilled in the art, for example cholesterol-substituted phenylbenzoates or biphenols.

Cholesteric main-chain polymers are generally prepared from a chiral component and from hydroxycarboxylic acids and/or a combination of dicarboxylic acids and diols. In general, said polymers essentially consist of aromatic constituents, but it is also possible to employ aliphatic and cycloaliphatic components, for example cyclohexanedicarboxylic acid.

For the purposes of the present invention, preference is given to cholesteric main-chain polymers comprising a) from 0 to 99.9 mol % of at least one compound from the group consisting of aromatic hydroxycarboxylic acids, cycloaliphatic hydroxycarboxylic acids and aromatic aminocarboxylic acids;

b) from 0 to 49.95 mol % of at least one compound from the group consisting of aromatic dicarboxylic acids and cycloaliphatic dicarboxylic acids;

c) from 0 to 49.95 mol % of at least one compound from the group consisting of aromatic diols, cycloaliphatic diols and aromatic diamines;

d) from 0.1 to 40 mol %, preferably from 1 to 25 mol %, of chiral, bifunctional comonomers, and e) from 0 to 5 mol % of a branchable component containing more than two functional groups (OH or COOH), where the sum is 100 mol %.

Regarding the percentages given, it should be ensured that the stoichiometry known to the person skilled in the art of the functional groups for the polycondensation is ensured.

In addition, the polymers can also contain components having more than two functional groups, for example dihydroxybenzoic acid, trihydroxybenzene or trimellitic acid. These components act as branching points in the polymer and may only be added in low concentrations, for example from 0 to 5 mol %, in order to prevent crosslinking of the material.

Particular preference is given to cholesteric main-group polymers built up from the following units of the individual monomer groups:

a) Aromatic hydroxycarboxylic acids and aminocarboxylic acids:

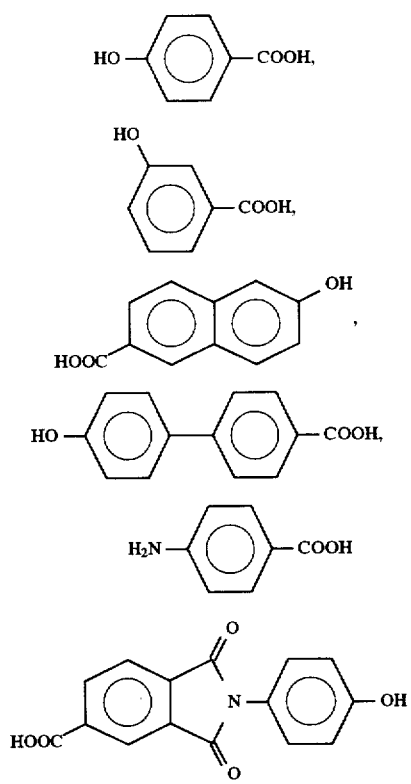

b) Aromatic dicarboxylic acids and aliphatic dicarboxylic acids:

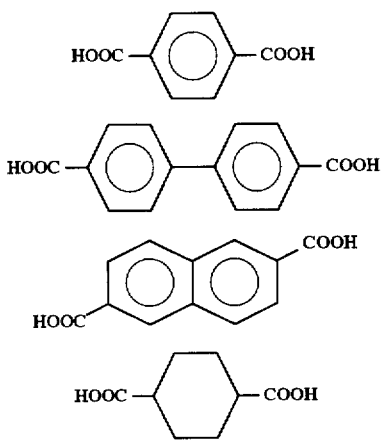

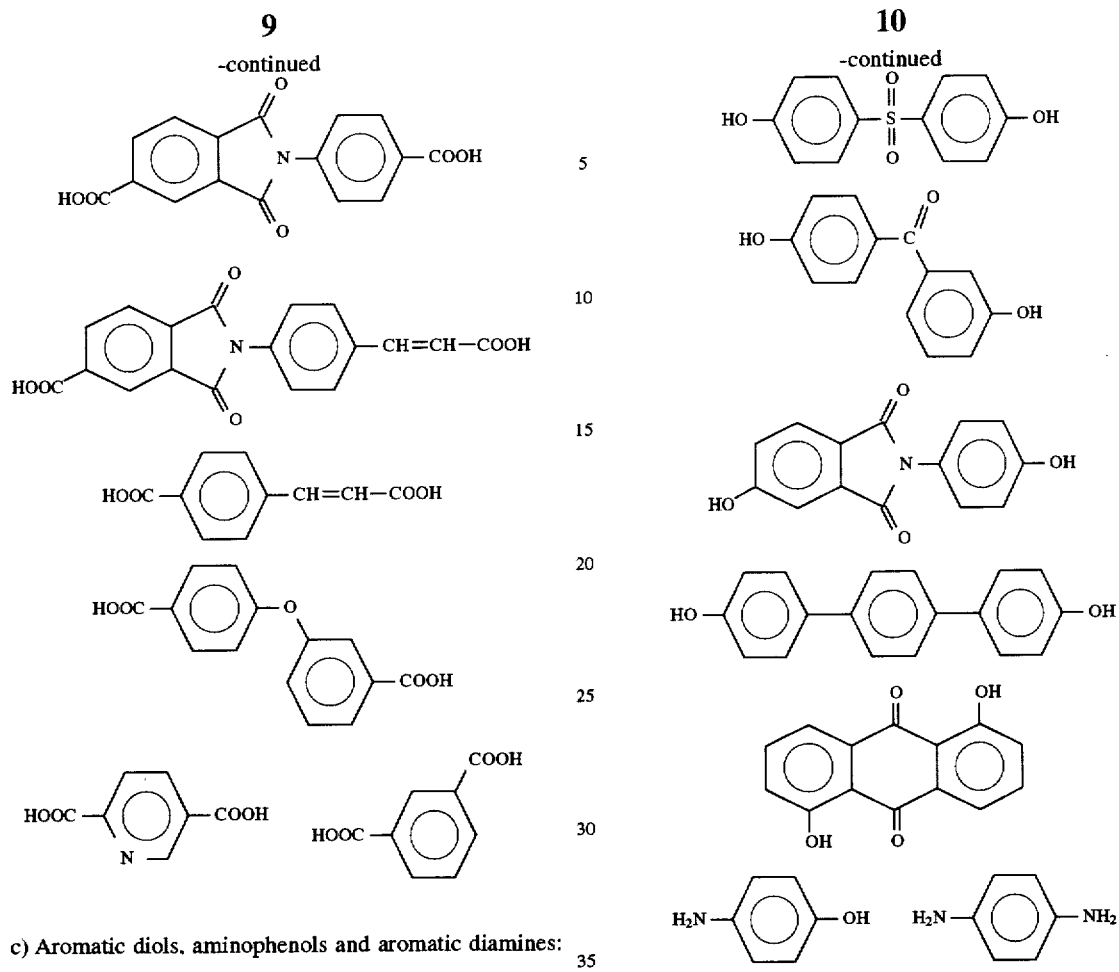
c) Aromatic diols, aminophenols and aromatic diamines:
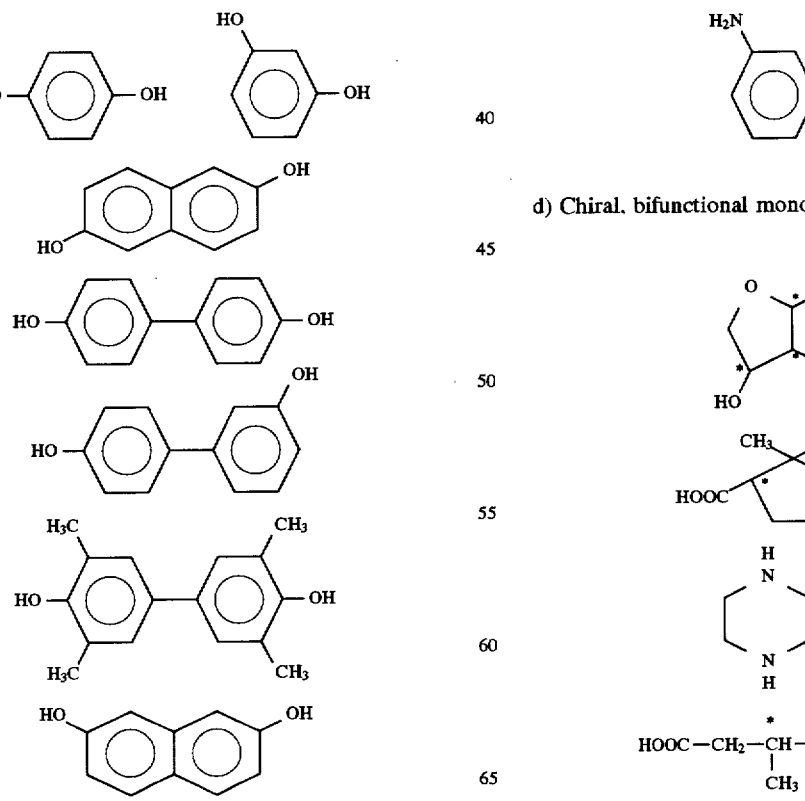
d) Chiral, bifunctional monomers:
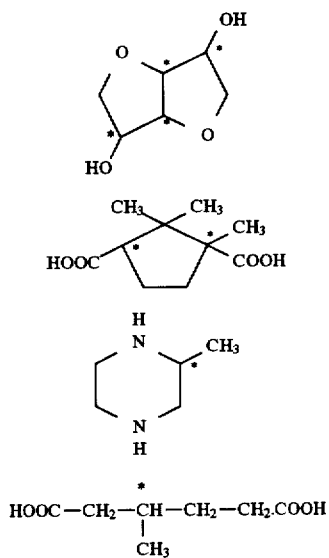

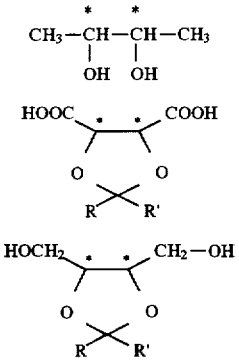

where R and R' are each, independently of one another, H, $C_1$–$C_6$-alkyl or phenyl, preferably H or $CH_3$.

The CLCPs are particularly preferably polymers containing camphoric acid and/or isosorbide as chiral component and p-hydroxybenzoic acid and/or 2-hydroxy-6-naphthoic acid and/or terephthalic acid and/or isophthalic acid and/or hydroquinone and/or resorcinol and/or 4,4'-dihydroxybiphenyl and/or 2,6-naphthalenedicarboxylic acid.

The chiral comonomers are preferably employed in enantiomerically pure form. If enantiomer mixtures of a comonomer are used, it must be ensured that one enantiomer form is present in an effective excess.

The monomers employed in accordance with the invention can be employed either directly or expedient precursors can be used which are converted into the desired monomers under the subsequent reaction conditions. For example, aminophenol and trimellitic anhydride can be employed instead of N-(4-hydroxyphenyl)trimellitimide.

The polycondensation can be carried out by any polycondensation process known to the person skilled in the art, for example melt condensation with acetic anhydride, which is described in EP-A-0 391 368.

The monomers are preferably linked via ester bonds (polyester) and/or via amide bonds (polyesteramide/ polyamide), but can also be linked via other types of linking known to the person skilled in the art, for example polyesterimide.

When selecting the monomer units, it must be ensured that the stoichiometry known to the person skilled in the art of the functional groups is ensured, i.e. that functional groups which react with one other in the polycondensation reaction are employed in appropriate ratios. For example, when using dicarboxylic acids and diols, a number of hydroxyl groups which matches the number of carboxyl groups must be present.

Instead of the carboxylic acids, it is also possible to employ carboxylic acid derivatives, for example acid chlorides or carboxylic acid esters. Instead of the hydroxyl components, it is also possible to employ corresponding hydroxyl derivatives, for example acetylated hydroxyl compounds.

The polymer units described may also contain further substituents, for example methyl, methoxy or halogen.

When using cholesteric side-group polymers, it is advantageous also to use liquid-crystalline side-group polymers as blend component.

The polymers to be blended can also contain crosslinkable groups, so that it is possible to fix the blend of liquid-crystal polymers by, for example, photocrosslinking.

In a preferred embodiment, both the CLCPs and the LCPs have very low solubility, so that their molecular weights cannot be determined by the otherwise usual methods (GPC or light scattering). The intrinsic viscosity of the polymers in a solution of pentafluorophenol/hexafluoroisopropanol can be employed as a measure of the molecular weight. For the purposes of the present invention, particularly suitable polymers are those having an intrinsic viscosity of from 0.1 to 10 dl/g. The intrinsic viscosity and thus the molecular weight of the CLCP and of the LCP may differ, but it is advantageous if they are both in a comparable order of magnitude.

The blending of the CLCPs and LCPs can be carried out in the melt in conventional equipment, for example compounders, extruders, mixing and melt reactors, high-shear mixers or roll mills. The use of an extruder is preferred here, since the desired color can be established directly by varying the polymer proportions. For example, sufficient LCP can be metered into a continuous extrusion of blue CLCP until the blend has the desired color, for example a green color. The precise hue can be determined directly on the extrudate. However, the polymers can also be preblended as powders or pellets and then extruded.

It is furthermore possible to precipitate and further process the blend from a common solution. For example, cholesteric side-group polysiloxanes, as described in DE-A1- 44 16 191 or U.S. Pat. No. 4,410,570, can be cast from a solution containing an achiral (nematic) side-group polysiloxane or a cholesteric side-group polysiloxane of a different color to give a film, which can be crosslinked by photocrosslinking, for example by UV irradiation, and further processed, and which is distinguished by the fact that its color can be set precisely through the mixing ratio.

The blend behaves like a new polymer, which can be processed further in a similar manner to the starting polymers, for example as a material. A material is a shaped structure, for example an injection molding, extruded profile or pipe, tape, film or fiber. The resultant blend is particularly suitable as base material for the preparation of platelet-shaped effect pigments, which are distinguished, in particular, by their hue reproducibility. The novel polymer blends are furthermore suitable as starting material for the production of effect coatings or powder effect coatings.

In the examples below, parts are by weight.

EXAMPLE 1

Synthesis of an LCP 28,218 parts of 2-hydroxy-6-naphthoic acid, 20,718 parts of 4-hydroxybenzoic acid, 16,614 parts of terephthalic acid, 9,310 parts of 4,4'-dihydroxybiphenyl and 5,505 parts of resorcinol are mixed in a reactor with 5,268 parts of acetic anhydride, and a gentle stream of nitrogen is passed through the reactor. The mixture is heated to 140° C. over the course of 15 minutes and then held at this temperature for 20 minutes. The temperature is then raised to 320° C. over the course of 150 minutes. Acetic acid begins to distill off from about 220° C. After the temperature has reached 320° C., the mixture is stirred at this temperature for a further 15 minutes. The nitrogen flushing is then terminated, and a vacuum is applied. The mixture is stirred in vacuo (about 5 mbar) for a further 30 minutes. The polymer is then aerated with nitrogen, cooled and isolated.

The polymer has the beige color which is typical of nematic main-chain polymers.

EXAMPLE 2

Synthesis of a CLCP 16,931 parts of 2-hydroxy-6-naphthoic acid, 20,718 parts of 4-hydroxybenzoic acid, 7,267 parts of biphenyl-4,4'- dicarboxylic acid and 4,384 parts of 1,4:3,6-dianhydro-D-sorbitol (isosorbide) are mixed in a reactor with 31,457 parts of acetic anhydride, and a gentle stream of nitrogen is passed through the reactor. The mixture is heated to 140° C. over the course of 15 minutes and then held at this temperature for 30 minutes. The temperature is then raised to 335° C. over the course of 165 minutes. Acetic acid begins to distill off from about 220° C. After the temperature has reached 335° C., the mixture is stirred at this temperature for a further 30 minutes. The nitrogen flushing is then terminated, and a vacuum is applied. The mixture is stirred in vacuo (about 5 mbar) for a further 30 minutes. The polymer is then aerated with nitrogen, cooled and isolated.

The polymer has a dark violet, dirty color. The color appears even during condensation in vacuo and is only retained after rapid cooling; if the sample is cooled slowly, the color disappears and a grey-beige polymer is obtained which readopts the dark violet color on heating.

EXAMPLE 3

Synthesis of a CLCP 22,582 parts of 2-hydroxy-6-naphthoic acid, 49,723 parts of 4-hydroxybenzoic acid, 9,968 parts of terephthalic acid and 8,714 parts of 1,4:3,6-dianhydro-D-sorbitol (isosorbide) are mixed in a reactor with 63,283 parts of acetic anhydride, and a gentle stream of nitrogen is passed through the reactor. The mixture is heated to 140° C. over the course of 15 minutes and then held at this temperature for 30 minutes. The temperature is then raised to 335° C. over the course of 165 minutes. Acetic acid begins to distill off from about 220° C. After the temperature has reached 335° C., the mixture is stirred at this temperature for a further 30 minutes. The nitrogen flushing is then terminated, and a vacuum is applied. The mixture is stirred in vacuo (about 5 mbar) for a further 30 minutes. After aeration with nitrogen, the polymer is extruded and pelletized.

The polymer has a dark violet, dirty color. The color appears even during condensation in vacuo.

EXAMPLE 4

Synthesis of a CLCP 45,163 parts of 2-hydroxy-6-naphthoic acid, 38,121 parts of 4-hydroxybenzoic acid, 6,977 parts of terephthalic acid and 6,138 parts of 1,4:3,6-dianhydro-D-sorbitol (isosorbide) are mixed in a reactor with 63,283 parts of acetic anhydride, and a gentle stream of nitrogen is passed through the reactor. The mixture is heated to 140° C. over the course of 15 minutes and then held at this temperature for 30 minutes. The temperature is then raised to 335° C. over the course of 165 minutes. Acetic acid begins to distill off from about 220° C. After the temperature has reached 335° C., the mixture is stirred at this temperature for a further 30 minutes. The nitrogen flushing is then terminated, and a vacuum is applied. The mixture is stirred in vacuo (about 5 mbar) for a further 30 minutes. After aeration with nitrogen, the polymer is extruded and pelletized.

The polymer has a beige, slightly shimmering color. The color appears even during condensation in vacuo and is retained after cooling.

EXAMPLE 5

Synthesis of a CLCP 28,218 parts of 2-hydroxy-6-naphthoic acid, 34,530 parts of 4-hydroxybenzoic acid, 8,609 parts of cyclohexane-1,4-dicarboxylic acid, 2,793 parts of 4,4'dihydroxybiphenyl and 5,115 parts of 1,4:3,6-dianhydro-D-sorbitol (isosorbide) are mixed in a reactor with 52,580 parts of acetic anhydride, and a gentle stream of nitrogen is passed through the reactor. The mixture is heated to 140° C. over the course of 15 minutes and then held at this temperature for 20 minutes. The temperature is then raised to 320° C. over the course of 150 minutes. Acetic acid begins to distill off from about 220° C. After the temperature has reached 320° C., the mixture is stirred at this temperature for a further 60 minutes. The nitrogen flushing is then terminated, and a vacuum is applied. The mixture is stirred in vacuo (about 5 mbar) for a further 30 minutes. The polymer is then aerated with nitrogen, cooled and isolated.

The polymer exhibits a golden green, bright color when viewed perpendicularly. The color appears even during condensation in vacuo and is retained even after cooling.

EXAMPLE 6

Synthesis of a CLCP 4,703 parts of 2-hydroxy-6-naphthoic acid, 3,453 parts of 4-hydroxybenzoic acid, 4,153 parts of terephthalic acid, 270 parts of p-phenylenediamine, 1,590 parts of dimethylbenzidine and 2,192 parts of 1,4:3,6-dianhydro-D-sorbitol (isosorbide) are mixed in a reactor with 10,460 parts of acetic anhydride, and a gentle stream of nitrogen is passed through the reactor. The mixture is heated to 140° C. over the course of 15 minutes and then held at this temperature for 20 minutes. The temperature is then raised to 325° C. over the course of 150 minutes. Acetic acid begins to distill off from about 220° C. After the temperature has reached 325° C., the mixture is stirred at this temperature for a further 60 minutes. The nitrogen flushing is then terminated, and a vacuum is applied. The mixture is stirred in vacuo (about 5 mbar) for a further 30 minutes. The polymer is then aerated with nitrogen, cooled and isolated.

The polymer has a violet color. The color appears even during condensation in vacuo and is retained even after cooling.

EXAMPLE 7

Synthesis of a CLCP 11,287 parts of 2-hydroxy-6-naphthoic acid, 13,812 parts of 4-hydroxybenzoic acid, 4,323 parts of naphthalene-2,6-dicarboxylic acid, 1,396 parts of 4,4'dihydroxybiphenyl and 1,826 parts of 1,4:3,6-dianhydro-D-sorbitol (isosorbide) are mixed in a reactor with 20,971 parts of acetic anhydride, and a gentle stream of nitrogen is passed through the reactor. The mixture is heated to 140° C. over the course of 15 minutes and then held at this temperature for 20 minutes. The temperature is then raised to 330° C. over the course of 150 minutes. Acetic acid begins to distill off from about 220° C. After the temperature has reached 330° C., the mixture is stirred at this temperature for a further 20 minutes. The nitrogen flushing is then terminated, and a vacuum is applied. The mixture is stirred in vacuo (7 mbar) for a further 40 minutes. The polymer is then aerated with nitrogen, cooled and isolated.

The polymer has a very bright, greenish yellow-gold color when viewed perpendicularly. The color appears even during condensation in vacuo and is retained even after cooling.

EXAMPLE 8

Synthesis of a CLCP 20,317 parts of 2-hydroxy-6-naphthoic acid, 39,778 parts of 4-hydroxybenzoic acid, 18,993 parts of 4,4'dihydroxybiphenyl and 20,424 parts of (1R,3S)-(+)-camphoric acid are mixed in a reactor with 62,914 parts of acetic anhydride, and a gentle stream of nitrogen is passed through the reactor. The mixture is heated to 140° C. over the course of 15 minutes and then held at this temperature for 30 minutes. The temperature is then raised to 335° C. over the course of 165 minutes. Acetic acid begins to distill off from about 220° C. After the temperature has reached 335° C., the mixture is stirred at this temperature for a further 30 minutes. The nitrogen flushing is then terminated, and a vacuum is applied. The mixture is stirred in vacuo (about 5 mbar) for a further 30 minutes. The polymer is then aerated with nitrogen, cooled and isolated.

The polymer has a golden red, bright color. The color appears even during condensation in vacuo.

EXAMPLE 9

Synthesis of a CLCP 4,703 parts of 2-hydroxy-6-naphthoic acid, 3,453 parts of 4-hydroxy-benzoic acid, 4,153 parts of terephthalic acid, 216 parts of p-phenylenediamine, 1,272 parts of dimethylbenzidine, 451 parts of diaminophenylbenzimidazole and 2,192 parts of 1,4:3,6-dianhydro-D-sorbitol (isosorbide) are mixed in a reactor with 10,460 parts of acetic anhydride, and a gentle stream of nitrogen is passed through the reactor. The mixture is heated to 140° C. over the course of 15 minutes and then held at this temperature for 20 minutes. The temperature is then raised to 320° C. over the course of 150 minutes. Acetic acid begins to distill off from about 220° C. After the temperature has reached 320° C., the mixture is stirred at this temperature for a further 60 minutes. The nitrogen flushing is then terminated, and a vacuum is applied. The mixture is stirred in vacuo (about 5 mbar) for a further 30 minutes. The polymer is then aerated with nitrogen, cooled and isolated.

The polymer has a greenish blue color. The color appears even during condensation in vacuo and is retained even after cooling. The material is very brittle.

EXAMPLE 10

Synthesis of a CLCP 1,411 parts of 2-hydroxy-6-naphthoic acid, 1,727 parts of 4-hydroxy-benzoic acid, 415 parts of terephthalic acid and 250 parts of (R)-(−)-2-methylpiperazine are mixed in a reactor with 2,619 parts of acetic anhydride, and a gentle stream of nitrogen is passed through the reactor. The mixture is heated to 140° C. over the course of 15 minutes and then held at this temperature for 30 minutes. The temperature is then raised to 330° C. over the course of 165 minutes. Acetic acid begins to distill off from about 220C. After the temperature has reached 330° C., the mixture is stirred at this temperature for a further 30 minutes. The nitrogen flushing is then terminated, and a vacuum is applied. The mixture is stirred in vacuo (about 5 mbar) for a further 30 minutes. The polymer is then aerated with nitrogen, cooled and isolated.

The polymer has a beige, slightly shimmering color. The color appears even during condensation in vacuo and is retained even after cooling.

EXAMPLE 11

Blend of an LCP and a CLCP

The polymers from Examples 1 and 2 are melted at 330° C. in a flask in an LCP:CLCP ratio of 1:2 and stirred for about 15 minutes to give a homogeneous blend.

The blend has a bright, blue color.

EXAMPLE 12

Blend of an LCP and a CLCP

The polymers from Examples 1 and 2 are melted at 330° C. in a flask in an LCP:CLCP ratio of 1:1 and stirred for about 15 minutes to give a homogeneous blend.

The blend has a bright, green color.

EXAMPLE 13

Blend of an LCP and a CLCP

The polymers from Examples 1 and 2 are melted at 330° C. in a flask in an LCP:CLCP ratio of 2:1 and stirred for about 15 minutes to give a homogeneous blend.

The blend has a bright, golden yellow color.

EXAMPLE 14

Blend of a CLCP and a CLCP 20 parts of the CLCP prepared in Example 3 are ground to a particle fineness of <5 mm in a cutting mill, and blended with 10 parts of the CLCP prepared in Example 4 which has been ground in the same way. The blend is then extruded in a single-screw extruder at temperatures of from 250° C. to 350° C., cooled using air and granulated, giving a blend which has a bright, blue color at a perpendicular viewing angle and a bright, reddish blue color at an oblique viewing angle. If this blend is applied by means of a spatula to a preheated, black-primed metal sheet, a film is obtained which is bright blue at a perpendicular viewing angle and exhibits bright, reddish blue selective reflection at an oblique viewing angle.

EXAMPLE 15

Blend of a CLCP with a CLCP

Example 14 is repeated with the blend of 15 parts of the CLCP prepared in Example 3 and 15 parts of the CLCP prepared in Example 4. A blend is obtained which has a bright, green-blue color at a perpendicular viewing angle and a bright, reddish blue color at an oblique viewing angle. If this blend is applied by means of a spatula to a preheated, black-primed metal sheet, a film is obtained which is bright, green-blue at a perpendicular viewing angle and has bright, blue selective reflection at an oblique viewing angle.

EXAMPLE 16

Blend of a CLCP with a CLCP

Example 14 is repeated with the blend of 10 parts of the CLCP prepared in Example 3 and 20 parts of the CLCP prepared in Example 4. A blend is obtained which has a bright, golden green color at a perpendicular viewing angle and a bright, bluish green color at an oblique viewing angle. If this blend is applied by means of a spatula to a preheated, black-primed metal sheet, a film is obtained which is bright, golden green at a perpendicular viewing angle and has bright, bluish green selective reflection at an oblique viewing angle.

EXAMPLE 17

Blend of a CLCP/LCP blend with a CLCP

The blend from Example 11 is compounded for 10 minutes with the CLCP from Example 5 in a weight ratio of 1:2 in a compounder at temperatures of from 300° C. to 350° C. A blend is obtained which has a bright, pale blue-turquoise color at a perpendicular viewing angle and a bright, dark-blue color at an oblique viewing angle. If this blend is applied by means of a spatula to a preheated, black-primed metal sheet, a film is obtained which is bright, pale blue-turquoise at a perpendicular viewing angle and has bright, azure blue selective reflection at an oblique viewing angle.

EXAMPLE 18

Blend of a CLCP with a CLCP

The CLCP from Example 6 is compounded for 10 minutes with the CLCP from Example 7 in a weight ratio of 1:2 in a compounder at temperatures of from 300° C. to 350° C. A blend is obtained which has a bright, turquoise color at a perpendicular viewing angle and a bright, azure blue color at an oblique viewing angle. If this blend is applied by means of a spatula to a preheated, black-primed metal sheet, a film is obtained which is bright, turquoise at a perpendicular viewing angle and has bright, azure blue selective reflection at an oblique viewing angle.

EXAMPLE 19

Blend of a CLCP with a CLCP

The CLCP from Example 8 is extruded with the CLCP from Example 9 in a weight ratio of 1:1 in a twin-screw extruder at temperatures of from 250° C. to 350° C. A blend is obtained which has a bright, yellowish green color at a perpendicular viewing angle and a bright, green-blue color at an oblique viewing angle. If this blend is applied by means of a spatula to a preheated, black-primed metal sheet, a film is obtained which is bright yellowish green at a perpendicular viewing angle and has bright, green-blue selective reflection at an oblique viewing angle.

EXAMPLE 20

Blend of a CLCP with a CLCP

The CLCP from Example 9 is extruded with the CLCP from Example 10 in a weight ratio of 3:2 in a twin-screw extruder at temperatures of from 285° C. to 350° C. A blend is obtained which has a bright, yellow-green color at a perpendicular viewing angle and a bright, greenish turquoise color at an oblique viewing angle. If this blend is applied by means of a spatula to a preheated, black-primed metal sheet, a film is obtained which is bright yellow-green at a perpendicular viewing angle and has bright, greenish turquoise selective reflection at an oblique viewing angle.

We claim:

1. A liquid-crystalline polymer blend comprising at least two cholesteric liquid-crystalline polymers or at least one nematic liquid-crystalline polymer and at least one cholesteric liquid-crystalline polymer.

2. A polymer blend as claimed in claim 1, which comprises at least one cholesteric liquid-crystalline polymer having selective reflection in the visible wavelength region of light and at least one cholesteric liquid-crystalline polymer having selective reflection in the invisible wavelength region of light.

3. A polymer blend as claimed in claim 1, which comprises at least two different cholesteric liquid-crystalline polymers, each of which has selective reflection in the visible wavelength region of light.

4. A polymer blend as claimed in claim 1, which comprises at least two different cholesteric liquid-crystalline polymers, each of which has selective reflection in the invisible wavelength region of light, but on different sides of the visible spectrum.

5. A polymer blend as claimed in claim 1, wherein the cholesteric liquid-crystalline polymers are cholesteric main-chain polymers.

6. A polymer blend as claimed in claim 1, wherein the cholesteric liquid-crystalline polymers are polyesters.

7. A polymer blend as claimed in claim 5, wherein from 1 to 25 mol % of chiral, bifunctional comonomers are present.

8. A polymer blend as claimed in claim 7, wherein the chiral bifunctional comonomer contains at least one compound of the formulae

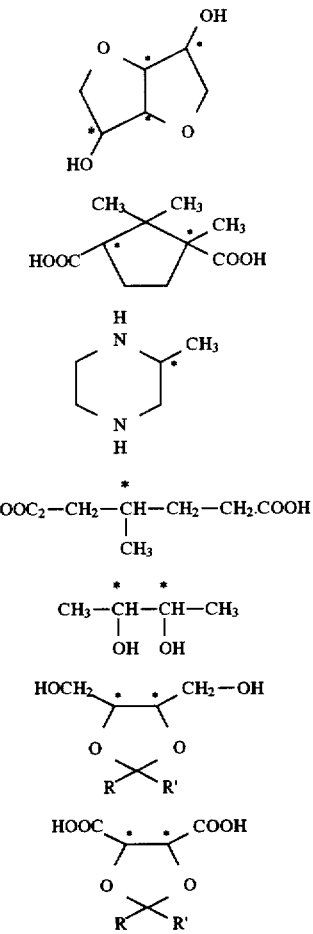

where R and R' are each, independently of one another, H, $C_1$–$C_6$-alkyl or phenyl.

9. A polymer blend as claimed in claim 1, wherein the cholesteric liquid-crystalline polymers are cholesteric side-group polymers.

10. A polymer blend as claimed in claim 9, wherein the side-group polymers contain polysiloxanes, cyclic siloxanes, polyacrylates, polymethacrylates or a combination thereof in the main chain and mesogenic groups in the side chains.

11. A process for the preparation of a liquid-crystalline polymer blend as claimed in claim 1, which comprises mixing the cholesteric liquid-crystalline polymers and, optionally, nematic liquid-crystalline polymers with one another in the melt, and, optionally, extruding the blend.

12. A polymer blend as claimed in claim 5, wherein the cholesteric main-chain polymer is the reaction product of the components comprising:
i) at least one compound having two ester-forming, amide-forming, or imide-forming groups or a combination of two said groups,
ii) from 0.1 to 40 mol-%, based on the total of said components, of a chiral compound which is bifunctional with respect to component i), and iii) from 0 to 5 mol-%, based on the total of said components, of at least one compound having more than two ester-forming, amide-forming, or imide-forming groups or a combination of more than two of said groups.

13. A polymer blend as claimed in claim 12, wherein said component i) comprises the reaction product of the components comprising hydroxybenzoic acid or hydroxynaphthoic acid or a combination thereof, terephthalic acid or isophthalic acid, biphenyl dicarboxylic acid or cyclohexane dicarboxylic acid or a combination thereof, dihydroxybiphenyl or hydroquinone or resorcinol or a combination thereof, or a combination thereof with a chiral compound.

14. A polymer blend as claimed in claim 12, wherein the amount of said component ii) ranges from 1 to 25 mol-%, based on the total of said components.

15. A polymer blend as claimed in claim 1, wherein the nematic liquid-crystalline polymer is the reaction product of the components comprising: an aromatic hydroxycarboxylic acid or an aromatic dicarboxylic acid and an aromatic diol, or a combination thereof.

16. In a polymer blend containing a helical cholesteric liquid-crystalline polymer having a helical structure, a method for increasing the pitch of said helical structure comprising the step of blending a second cholesteric liquid-crystalline polymer with said helical cholesteric liquid-crystalline polymer or blending a nematic liquid-crystalline polymer with said helical cholesteric liquid-crystalline polymer.

17. A shaped structure comprising a polymer blend as claimed in claim 1.

18. A platelet-shaped effect pigment comprising a polymer blend as claimed in claim 1 in the shape of platelets.

19. An effect coating with effect coloristic properties, comprising a polymer blend as claimed in claim 1.

* * * * *